United States Patent [19]

Muller et al.

[11] Patent Number: 4,827,784
[45] Date of Patent: May 9, 1989

[54] VEHICLE DRIVING MECHANISM HAVING A SYNCHROMESH GEARBOX WITH AN ADDITIONAL CLUTCH IN EACH OF TWO POWER BRANCHES

[75] Inventors: Franz Muller; Erwin Baur; Herbert Simon, all of Friedrichshafen; Hubert Sailer, Markdorf, all of Fed. Rep. of Germany

[73] Assignee: Zahnradfabrik Friedrichshafen AG, Fed. Rep. of Germany

[21] Appl. No.: 69,326

[22] Filed: Jul. 2, 1987

Related U.S. Application Data

[63] Continuation-in-part of Ser. No. 723,954, filed as PCT EP84/00218 on Jul. 17, 1984, published as WO85/01332 on Mar. 28, 1985, abandoned.

[30] Foreign Application Priority Data

Sep. 15, 1983 [WO] PCT Int'l Appl. .......... PCT/EP83/00245

[51] Int. Cl.⁴ ................. F16H 3/08; F16D 25/10
[52] U.S. Cl. ...................... 74/330; 74/357; 74/359; 192/48.91; 192/70.12; 192/87.17; 192/106 F
[58] Field of Search .......... 192/48.91, 70.12, 70.28, 192/85 AA, 87.14, 87.15, 87.16, 87.17, 106 F, 113 B; 74/330, 333, 357, 359, 362, 363, 375

[56] References Cited

U.S. PATENT DOCUMENTS

| | | | |
|---|---|---|---|
| 2,217,357 | 10/1940 | Coe | 192/70.28 |
| 2,775,331 | 12/1956 | Peterson | 192/113 B |
| 3,105,582 | 10/1963 | Ziabicki | 192/48.91 X |
| 3,537,557 | 11/1970 | Olson | 192/106 F |
| 3,762,520 | 10/1973 | Busch | 192/106 F |
| 3,769,857 | 11/1973 | Whateley | 74/330 X |
| 3,823,802 | 7/1974 | Winzeler et al. | 192/113 B |
| 3,834,503 | 9/1974 | Mauer et al. | 192/87.17 X |
| 3,863,746 | 2/1975 | Schulz | 192/113 B |
| 4,134,483 | 1/1979 | Horsch | 192/87.17 X |
| 4,371,066 | 2/1983 | Fujioka et al. | 192/85 AA |

FOREIGN PATENT DOCUMENTS

| | | | |
|---|---|---|---|
| 1249708 | 9/1967 | Fed. Rep. of Germany | 74/330 |
| 2103317 | 2/1983 | United Kingdom | 74/330 |

Primary Examiner—Rodney H. Bonck
Assistant Examiner—Richard M. Lorence
Attorney, Agent, or Firm—Davis, Bujold & Streck

[57] ABSTRACT

In a mechanism for driving motor vehicles having a synchromesh gearbox with a friction clutch for each of two power branches with at least four power shiftable speeds and consecutive speeds are alternatively present on each one of the two power branches. Each friction clutch is a wet disc clutch with its inner discs having continuous radial grooves for a cooling oil flow supplied from a bore in a shaft. A switch piston shuts off the flow of cooling oil when the friction clutch is disengaged or almost completely disengaged. A prestressed cup spring in a compensating cylinder serves as a strong return spring thereby accelerating disengagement or delaying engagement of the friction clutch. Corrugated spring rings, axially situated between the inner discs and radially within the outer discs, serve as additional return springs. The wet clutch operates as a dry clutch and only has a low torque when it is disengaged. A large flow of cooling oil flows to the friction clutch and cools it as it engages and when it is engaged. The wet friction clutch replaces a conventional dry friction clutch, especially when starting up the motor vehicle.

7 Claims, 4 Drawing Sheets

VEHICLE DRIVING MECHANISM HAVING A SYNCHROMESH GEARBOX WITH AN ADDITIONAL CLUTCH IN EACH OF TWO POWER BRANCHES

This is a continuation-in-part of copending application Ser. No. 723,954, filed as PCT EP84/00218 on Jul. 17, 1984, published as WO85/01332 on Mar. 28, 1985, now abandoned.

The invention concerns a mechanism for driving motor vehicles which includes the following features:
a synchromesh gearbox with fixed gears, idler gears and synchronized shift clutches;
said synchromesh gearbox forms two power branches;
each power branch has on a first shaft at least two fixed gears and on a second shaft at least two idler gears and at least two synchronized shift clutches;
each power branch in addition contains one wet friction clutch;
each power branch has at least two speeds;
in each speed the power flows via a gear set formed by a fixed gear and an idler gear, via a synchronized shift clutch and a friction clutch;
consecutive speeds are alternatively present in one of said two power branches;
said friction clutch is a disc clutch with inner discs and outer discs;
a cooling oil flows from a bore in the shaft and cools said inner and outer discs;
a switch piston and a cylinder housing form an actuation means having an annular chamber;
fluid pressure in said chamber pushes said switch piston axially against said inner discs and said outer discs and engages said friction clutch; and
return springs disengage said friction clutch.

With a mechanism of this kind the shifts between contiguous speeds are power shiftable and during one such shift power can be transferred without interruption from a drive via the synchromesh gearbox to a driving axle having driving gears, since only one of the two wet friction clutches disengages while the other wet friction clutch is already engaging.

In known mechanisms of this kind (DE-OS 32 28 353), two wet friction clutches are used for these power shifts between contiguous speeds only. An additional dry main clutch, situated as usual between the drive engine and the synchromesh gearbox, serves to start up the motor vehicle.

This dry main clutch has several disadvantages, especially in a tractor:
it increases the total structural length and weight;
it creates problems on account of the need to protect it against fouling due to leakages from the two adjacent oil chambers;
it is difficult to access because it is situated in a clutch housing that forms part of the vehicle frame;
it is subject to abrasion in a manner such that during the lifetime of the vehicle several abraded parts have to be replaced; each time this requires the vehicle frame between engine and gearing to be taken apart.

The present invention is based on the problem of improving wet friction clutches in a mechanism of this kind in a manner such that an additional main clutch, especially a dry main clutch, is not necessary.

The wet friction clutch is quickly converted into a dry friction clutch, as soon as it is entirely disengaged, because the switch piston shuts off the flow of cooling oil to the inner and outer discs upon disengagement.

The friction clutch disengages more quickly since the pressure fluid from the chamber of the actuation cylinder flows more quickly into the tank.

The friction clutch disengages more quickly since the switch piston is moved from its engaged position by a strong spring just during the beginning of its disengagement stroke. The friction clutch engages quickly and without impact since the switch piston, during a large part of the beginning of its engaging stroke, moves quickly against a weak spring and only for a last small part of its engaging stroke does it move against a strong spring.

The friction clutch is especially axially short, since the cup spring is situated in the compensating cylinder chamber and does not need any special building space.

The friction clutch disengages especially quickly and completely, since the corrugated spring rings and the outer discs, designed as corrugated spring plates, quickly open an individual axial clearance between the inner discs and the outer discs and allow the cooling oil to flow quickly out of each individual axial clearance.

The double clutch involves low manufacturing and assembly expenses since many structural parts are the same for both friction clutches.

The mechanism of the invention is illustrated in the drawings, which show:

Figure 1:
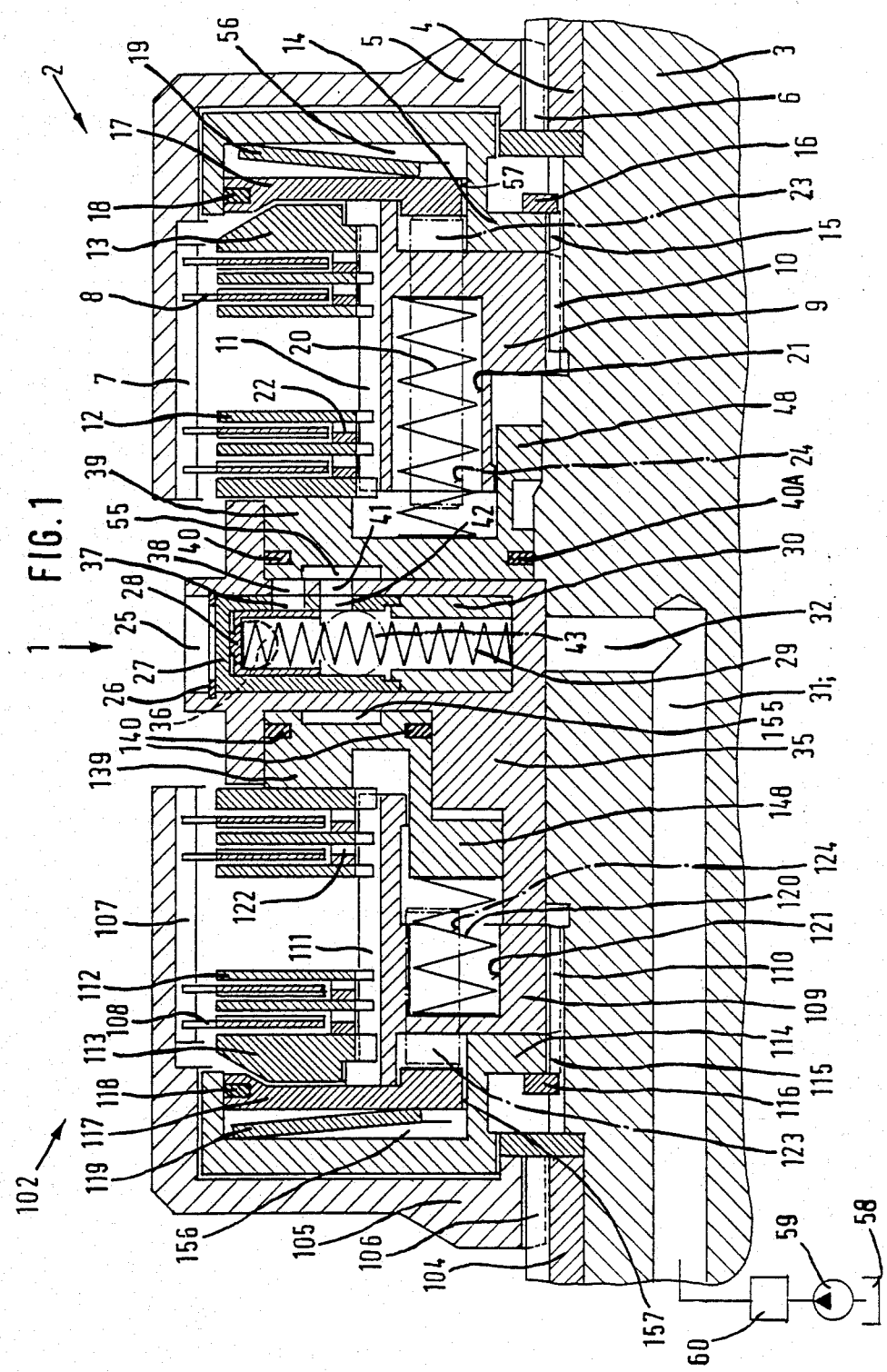
FIG. 1 is a longitudinal section through a double clutch.
Figure 2:
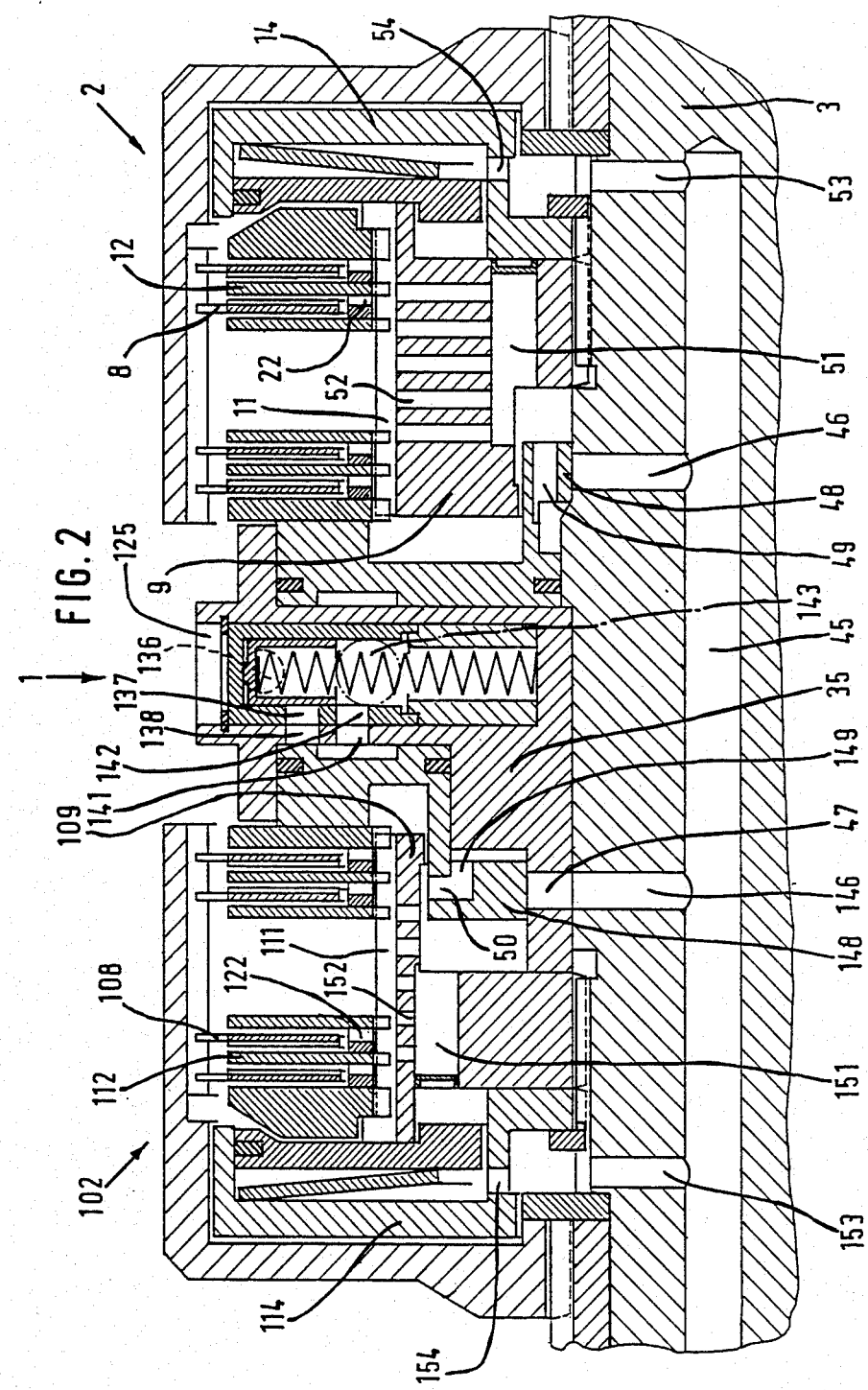
FIG. 2 is a second longitudinal section through the double clutch.

The two friction clutches 2, 102 form a double clutch 1 having a common shaft 3 and two separate tubular shafts 4, 104. Outer disc carriers 5, 105 are connected via spline sections 6, 106 with the separate shafts 4, 104 and carry therewith, by spline sections 7, 107, outer discs 8, 108. Inner disc carriers 9, 109 are connected via spline sections 10, 110 with the common shaft 3 and carry therewith, by spline sections 11, 111, inner discs 12, 112 and end plates 13, 113. The two clutches preferably have the same number of inner and outer discs and the discs (8, 12, 108, 112) are provided with radial grooves 75 (see FIGS. 5 and 6) which allow cooling oil to flow between adjacent discs. The compensating cylinders 14, 114 are connected via spline sections 15, 115 with the common shaft 3 and are axially locked together with the inner disc carriers 9, 109 by the guard rings 16, 116. Compensating pistons 17, 117 with outer sealing rings 18, 118 and cup springs 19, 119 are situated in the compensating cylinders 14, 114. Compression springs 20, 120 and pins 23, 123 are situated in bores 24, 124 of the inner disc carriers 9, 109. A cylinder housing 35 is secured on the shaft 3 between the inner disc carriers 9 and 109. A large switch piston 39, with outer and inner sealing rings 40, 40A, and a small switch piston 139, with outer and inner sealing rings 140, 140A are contained in said cylinder housing 35. Drain valves 27, 28, 29, 30; 127, 128, 139, 130; having valve housing 27, 127, valve spools 28, 128, springs 29, 129 and sleeves 30, 130 (see FIG. 1) are situated in bores 25, 125 of the cylinder housing 35 and secured by guard rings 26, 126.

Figure 3:
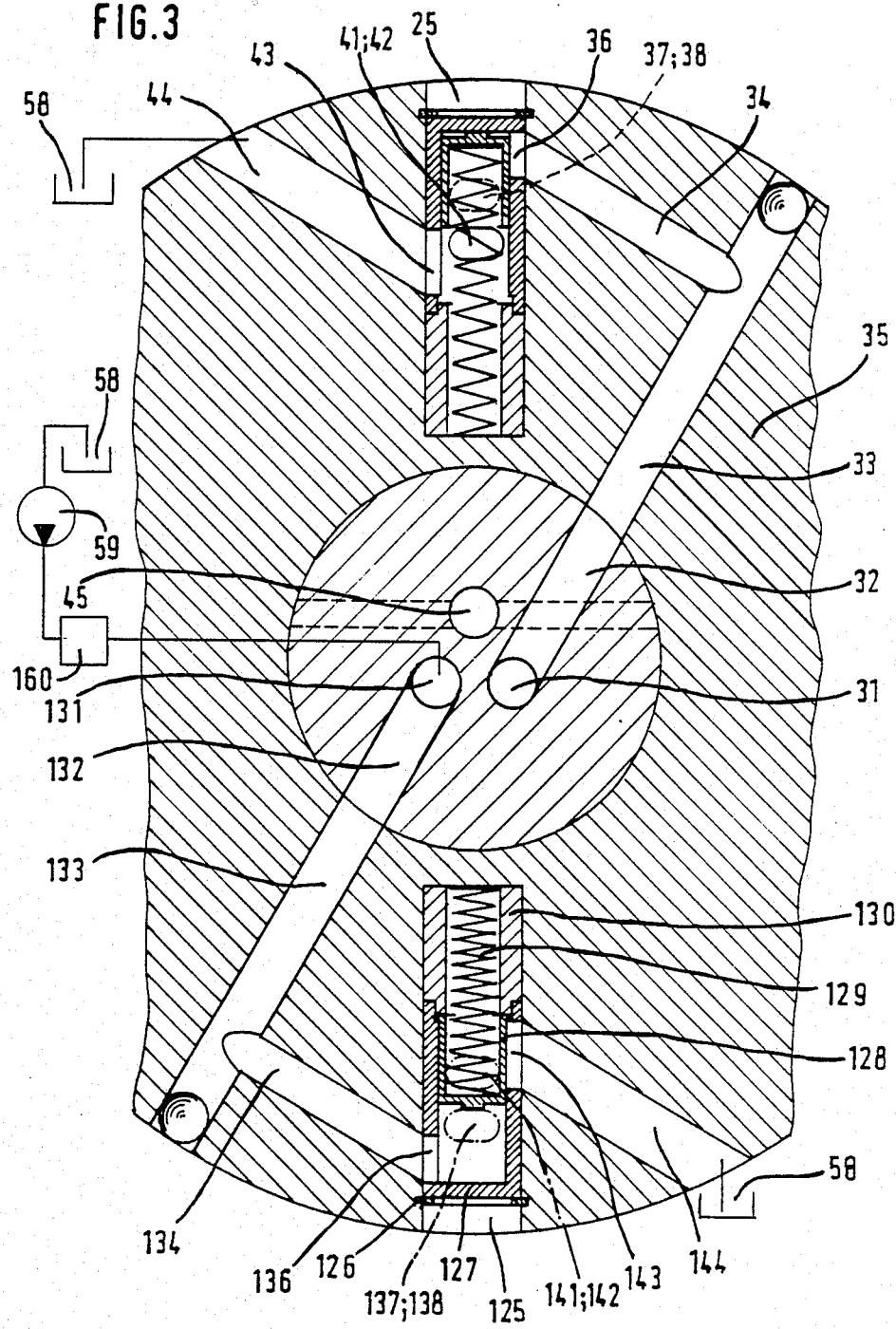
FIG. 3 is a cross section through the double clutch.

To engage friction clutch 2 or 102, pressure fluid is delivered by a fluid pump 59 from a tank 58 which is controlled by a valve spool 60 or 160. The fluid flows via bores 31, 32 or 131, 132 of the common shaft 3, bores 33, 34 or 133, 134 in the cylinder housing 35 and openings 36, 37, 38 or 136, 137, 138 to a chamber 55 or 155 (see FIG. 3).

When disengaging the friction clutch 2 or 102, only a small portion of the pressure fluid flows back via the same long flow path. A major portion of the pressure fluid flows back from the chamber 55 or 155 via openings 41, 42 or 141, 142 and bores 43, 44 or 143, 144 into the tank 58 which is a shorter path for the pressure fluid. The chamber 55 or 155 is therefore emptied more quickly than it is filled.

When the friction clutch 2 or 102 is engaged or almost completely engaged, cooling oil flows from a bore 45 in the common shaft 3 via bores 46, 49, 51, 52, or 146, 47, 149, 50, 151, 152 into radial grooves of the inner discs 12 or 112 and the outer discs 8 or 108.

However, when the friction clutch 2 or 102 is disengaged or almost completely disengaged, the extension 48 or 148 of the switch piston 39 or 139 shuts off bore 46 or 47 and therewith the flow of cooling oil to the inner discs 12 or 112 and the outer discs 8 or 108.

The cooling oil, from the bore 45 in the common shaft 3, always flows via bores 53, 54 or 153, 154 into compensating cylinders 14, 114 and fills the compensating cylinders 14, 114 up to the edge 57, 157.

Corrugated spring rings 22 or 122 are situated axially between the inner discs 12 or 112 and the end plate 13 or 113 and radially between the outer discs 8 or 108 and the inner disc carrier 9 or 109 (See FIG. 1).

When engaging the friction clutch 2 or 102, the fluid pressure pushes first the piston 28 or 128 of the drain valve 27, 28, 29, 30 or 127, 128, 129, 130 against the spring 29 or 129 up to the sleeve 30 or 130, and then pushes the switch piston 39 or 139 first against the compression spring 20 or 120 and the corrugated spring rings 22 or 122, then further against the outer discs 8 or 108 designed as corrugated spring plates, then indirectly, via the pin 23 or 123 and the compensating piston 17 or 117, against the cup spring 19 or 119 until all the inner discs 12 or 112 and outer discs 8 or 108 are held free of play between the switch piston 39 or 139 and the end plate 13 or 113 and the required torque is reached (See FIG. 1).

When disengaging a friction clutch 2 or 102, at first all the return springs are again active. Especially the prestressed cup spring 19 or 119, with its great spring tension, ensures that the switch piston 39 or 139 will be quickly pushed back a small portion of the distance so that the torque becomes smaller. Thereafter, when the cup spring 19, 119 becomes inactive, since it abuts via the compensating piston 17 or 117 against the inner disc carrier 9 or 109, and when thereby the pressure of the pressure fluid of the piston 28 or 128 becomes so small that the spring 29 or 129 pushes back the piston 28 or 128, the pressure fluid from the chamber 55 or 155 can easily flow back along a short path to the tank 58, and the small spring tension of the remaining return springs suffice to quickly push back the switch piston 39 or 139 completely, and to provide all the outer discs 8 or 108 with sufficient axial play to allow them to move freely without wobbling. At the same time, the axial extension 48 or 148 of the switch piston 39 or 139 shuts off the flow of cooling oil to the inner discs 12 or 112 and the outer discs 8 or 108 and the wet friction clutch 2 or 102 moves as dry clutch with a very low idle torque. The maximum spring force of the return springs (19, 119; 20, 120; 22, 122) is preferably 5% to 20% the maximum force of the switch piston 39, 139.

Figures 4, 5, 6:
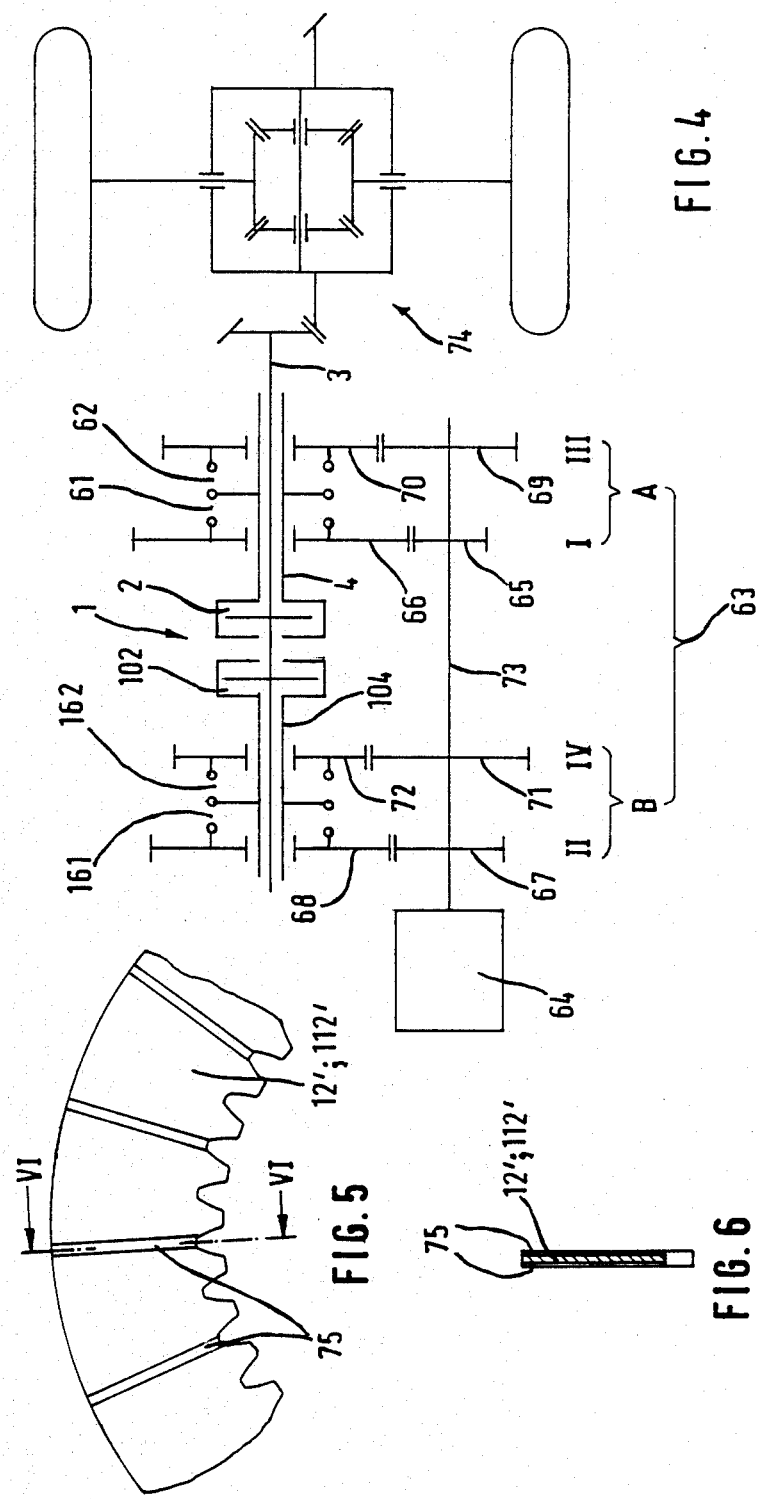
FIG. 4 is a diagramatic representation of a synchromesh gearbox for use with the present invention.
FIG. 5 is a partial plan view of a clutch disc having radial grooves.
FIG. 6 is a cross-sectional view of the clutch disc of FIG. 5 along lines VI—VI.

Turning now to FIG. 4, it can be seen diagramatically that an engine 64 drives an input shaft 73 with four fixed gears 65, 67, 69, 71 which in turn drive idler gears 66, 68, 70, 72, respectively. The idler gears 66 or 70 can be connected to a first intermediate shaft 4 via a first or third shift clutch 61 or 62, respectively, and the idler gears 68 or 72 can be connected to a second intermediate shaft 104 via a second or a fourth shift clutch 161 or 162, respectively. The intermediate shafts 4 or 104 can be connected to an output shaft 3 via a first or a second friction clutch 2 or 102, respectively. The output shaft 3 drives a conventional final drive of an axel 74. To form a first speed (I) of the four speed gear box 63, the output shaft 3 must be connected with the input shaft 73 via the fixed gear 65, the idle of gears 66, the first shift clutch 61, and the first friction clutch 2. To form a second speed (II) the shafts 3 and 73 must be connected via the fixed gear 67, the idler gear 68, the second shift clutch 161, and the second friction clutch 102. To form a third speed (III), the shafts 3 and 73 must be connected via the fixed gear 69, the idler gear 70, the third shift clutch 62, and the first friction clutch 2. To form a fourth speed (IV), the shafts 3 and 73 must be connected via the fixed gear 71, the idler gear 72, the fourth shift clutch 162, and the second friction clutch 102.

Wherefore, having described our invention, we claim:

We claim:

1. A mechanism for driving motor vehicles comprising:
    a synchromesh gearbox, with fixed gears, idler gears and synchronized shift clutches forming two power branches;
    each power branch has on a first shaft at least two fixed gears and on a second shaft at least two idler gears and at least two synchronized shift clutches;
    each power branch contains one wet friction clutch and at least two non-consecutive speeds;
    in each speed, power flows via a gear set formed by a fixed gear and an idler gear, via a synchronized shift clutch and a friction clutch;
    said friction clutch is a disc clutch with inner discs and outer discs;
    a cooling oil flows from a bore in one shaft and cools said inner and outer discs;
    a switch piston and a cylinder housing form actuation means having an annular chamber;
    fluid pressure in said chamber pushes said switch piston axially against said inner discs and said outer discs and engages said friction clutch; and
    return springs disengage said friction clutch; the improvement comprising:
    said switch piston (39 or 139), with an axial extension (48 or 148), forms a sliding sleeve of a piston valve (3, 48, or 3, 148) for controlling the flow of the cooling oil to the inner discs (12 or 112) and outer discs (8 or 108);
    said switch piston (39 or 139) shuts off the cooling oil flow when said friction clutch (2 or 102) is disengaged or almost completely disengaged and supplies cooling oil flow almost immediately after said switch piston (39 or 139) begins to engage said friction clutch (2 or 102) and, upon engagement, a large amount of cooling oil flows through radial grooves in said inner discs (12 or 112);

an inner disc carrier (9 or 109) for said inner discs (12 or 112) is situated axially, for common rotation, between said cylinder housing (35) having a radial annular chamber (56 or 156) and a compensating cylinder (14 or 114) having a compensating piston (17 or 117);

a compression spring (20 or 120), axially situated between said inner disc carrier (9 or 109) and said switch piston (39 or 139) forms a weak return spring and a prestressed cup spring (19 or 119) axially situated between said compensating cylinder (14 or 114) and said compensating piston (17 or 117), forms a strong return spring for disengaging said friction clutch (2 or 102);

pins (23 or 123) in bores (24 or 124) of said inner disc carrier (9 or 109), situated axially between said compensating piston (17 or 117) and said switch piston (39 or 139), transmit axial force to and from said compensating piston (17 or 117) and said switch piston (39 or 139);

said pins (23 or 123) being active only during the beginning of disengagement and during the end of engagement of said friction clutch (2 or 102);

wherein said friction clutch (2 or 102) also serves to start up the motor vehicle and said return springs having a maximum force of 5% to 20% of a maximum force of said switch piston (39 or 139).

2. A mechanism according to claim 1, further characterized by:

a drain valve (27, 28, 29, 30 or 127, 128, 129, 130), having a valve housing (27 or 127), a valve spool (28 or 128), a spring (29 or 129) and a sleeve (30 or 130) all situated in the cylinder housing (35);

said spring (29 or 129) presses said valve spool (28 or 128) radially outwardly into a first position so that said drain valve (27, 28, 29, 30 or 127, 128, 129, 130) connects the chamber (55 or 155) of the actuation cylinder (35, 39, or 35, 139) with a tank (58) via a special bore (44 or 144); and fluid pressure from said tank (58), delivered by a fluid pump (59) controlled by a switch valve (60 or 160), flows through bores (31, 32, 33, 34 or 131, 132, 133, 134) and forces said valve spool (28 or 128) radially inwardly into a second position and thereby allows flow past said spool (28 or 128) into said chamber (55 or 155).

3. A mechanism according to claim 1, characterized by:

said switch piston (39 or 139) has a long stroke; and
said strong spring (19 or 119) is only active during the beginning of disengagement and the end of engagement of said friction clutch (2 or 102).

4. A mechanism according to claim 1, characterized by:

corrugated spring rings (22 or 122) are situated axially between said inner discs (12 or 112) and the end plates (13, 113) and radially between said outer discs (8 or 108) and said inner disc carrier (9 or 109); and said outer discs (8 or 108) forming additional weak return springs in the form of corrugated spring plates.

5. A mechanism according to claim 1, characterized by:

the two friction clutches (2 and 102) are structurally joined to form a double clutch (1);

said two friction clutches (2 and 102) have the same number of inner discs (12 and 112) and outer discs (8 and 108); and said two switch pistons (39 and 139) of said two friction clutches (2 and 102) are of a different size.

6. A mechanism for driving motor vehicles comprising:

a synchromesh gearbox, with fixed gears, idler gears and synchronized shift clutches forming two power branches;

each power branch has on a first shaft at least two fixed gears and on a second shaft at least two idler gears and at least two synchronized shift clutches;

each power branch contains one wet friction clutch and at least two non-consecutive speeds;

in each speed, power flows via a gear set formed by a fixed gear and an idler gear, via a synchronized shift clutch and a friction clutch;

said friction clutch is a disc clutch with inner discs and outer discs;

a cooling oil flows from a bore in one shaft and cools said inner and outer discs;

a switch piston and a cylinder housing form actuation means having an annular chamber;

fluid pressure in said chamber pushes said switch piston axially against said inner discs and said outer discs and engages said friction clutch; and return springs disengage said friction clutch; the improvement comprising:

said switch piston (39 or 139), with an axial extension (48 or 148), forms a sliding sleeve of a piston valve (3, 48, or 3, 148) for controlling the flow of the cooling oil to the inner discs (12 or 112) and outer discs (8 or 108);

said switch piston (39 or 139) shuts off the cooling oil flow when said friction clutch (2 or 102) is disengaged or almost completely disengaged and supplies cooling oil flow almost immediately after said switch piston (39 or 139) beings to engage said friction clutch (2 or 102) and, upon engagement, a large amount of cooling oil flows through radial grooves in said inner discs (12 or 112); and an inner disc carrier (9 or 109) for said inner disc (12 or 112) is situated axially, for common rotation, between said cylinder housing (35) having a radial annular chamber (56 or 156) and a compensating cylinder (14 or 114) having a compensating piston (17 or 117).

7. A mechanism according to claim 6, characterized by:

a compression spring (20 or 120), axially situated between said inner disc carrier (9 or 109) and said switch piston (39 or 139) forms a weak return spring and a prestressed cup spring (19 or 119) axially situated between said compensating cylinder (14 or 114) and said compensating piston (17 or 117), forms a strong return spring for disengaging said friction clutch (2 or 102);

pins (23 or 123) in bores (24 or 124) of said inner disc carrier (9 or 109), situated axially between said compensating piston (17 or 117) and said switch piston (39 or 139), transmit axial force to and from said compensating piston (17 or 117) and said switch piston (39 or 139);

said pins (23 or 123) being active only during the beginning of disengagement and during the end of engagement of said friction clutch (2 or 102);

wherein said friction clutch (2 or 102) also serves to start up the motor vehicle and said return springs having a maximum force of 5% to 20% of a maximum force of said switch piston (39 or 139).

* * * * *